(12) United States Patent
Knoblauch et al.

(10) Patent No.: US 10,108,576 B2
(45) Date of Patent: Oct. 23, 2018

(54) DEVICE ABSTRACTED ZONE MANAGEMENT OF SERIAL ATTACHED SMALL COMPUTER SYSTEM INTERFACE TOPOLOGIES

(71) Applicant: Avago Technologies General IP (Singapore) Pte. Ltd, Singapore OT (SG)

(72) Inventors: Benjamin Knoblauch, Milpitas, CA (US); Charles D. Henry, Wichita, KS (US); Jason A. Unrein, Wichita, KS (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 487 days.

(21) Appl. No.: 14/038,166

(22) Filed: Sep. 26, 2013

(65) Prior Publication Data

US 2015/0286604 A1 Oct. 8, 2015

(51) Int. Cl.
*G06F 13/42* (2006.01)
*G06F 13/40* (2006.01)

(52) U.S. Cl.
CPC ...... *G06F 13/4221* (2013.01); *G06F 13/4027* (2013.01)

(58) Field of Classification Search
CPC .... G06F 13/14; G06F 13/4265; G06F 15/173; G06F 13/4221; G06F 13/4027
See application file for complete search history.

(56) References Cited

U.S. PATENT DOCUMENTS

| | | | |
|---|---|---|---|
| 7,437,462 B2 | 10/2008 | Marks | |
| 7,990,961 B2 | 8/2011 | Petty | |
| 2008/0028107 A1* | 1/2008 | Cherian | G06F 3/0607 710/9 |
| 2009/0007154 A1* | 1/2009 | Jones | G06F 3/0607 719/326 |
| 2009/0007155 A1 | 1/2009 | Jones | |
| 2009/0083423 A1* | 3/2009 | Basham | G06F 3/0605 709/226 |
| 2011/0022736 A1* | 1/2011 | Uddenberg | G06F 13/4282 710/2 |
| 2012/0059991 A1 | 3/2012 | Cuddihi | |
| 2012/0239837 A1* | 9/2012 | Odenwald, Jr. | G06F 13/14 710/104 |
| 2012/0254553 A1* | 10/2012 | Myrah | H04L 67/1097 711/154 |

(Continued)

*Primary Examiner* — Tim T Vo
*Assistant Examiner* — Phong H Dang
(74) *Attorney, Agent, or Firm* — Sheridan Ross P.C.

(57) ABSTRACT

Systems and methods provide zone management for devices in a Serial Attached Small Computer System Interface (SAS) topology. In one embodiment, a zone management device stores a zone map that identifies an initial zone of a device in the topology. The management device detects changes in the topology, and identifies a current zone of the device subsequent to the change in the topology. The management device compares the zone map for the device to the current zone to identify a change in the zone of the device, and generates a message for an expander in the topology based on the change in the zone. The management device then transmits the message to the expander to restore the zone of the device to the initial zone.

20 Claims, 3 Drawing Sheets

(56) References Cited

U.S. PATENT DOCUMENTS

| | | | |
|---|---|---|---|
| 2013/0117766 A1* | 5/2013 | Bax | G06F 9/4405 719/323 |
| 2013/0124801 A1* | 5/2013 | Natrajan | G06F 12/0868 711/126 |
| 2013/0227341 A1* | 8/2013 | Myrah | G06F 11/1658 714/6.1 |
| 2013/0238930 A1* | 9/2013 | Umbehocker | G06F 11/2092 714/6.32 |
| 2013/0265867 A1* | 10/2013 | Natrajan | H04L 45/025 370/217 |
| 2014/0019645 A1* | 1/2014 | Joshi | H04L 49/00 710/5 |
| 2014/0156878 A1* | 6/2014 | Hameed | H04L 67/1097 710/19 |
| 2014/0297910 A1* | 10/2014 | Black | G06F 13/4265 710/104 |

* cited by examiner

DEVICE ABSTRACTED ZONE MANAGEMENT OF SERIAL ATTACHED SMALL COMPUTER SYSTEM INTERFACE TOPOLOGIES

FIELD OF THE INVENTION

The invention generally relates to the field of data storage systems.

BACKGROUND

In a Serial Attached Small Computer System Interface (SAS) storage network that includes expanders, zoning can be used to restrict communication between SAS devices. Zoning is performed by assigning individual PHYsical interfaces (PHYs) on expanders to one of up to 256 different zones. Devices that are coupled to a PHY (e.g., expanders or storage devices) then belong to the zone assigned to the PHY. In a SAS topology that utilizes zoning, problems can arise when devices move to different PHYs within the topology, due to the fact that zoning is performed on a per-PHY basis.

SUMMARY

Systems and methods presented herein provide zone management for devices in a SAS topology. In one embodiment, a zone management device stores a zone map that identifies an initial zone of a device in the topology. The management device detects changes in the topology, and identifies a current zone of the device subsequent to the change in the topology. The management device compares the zone map for the device to the current zone to identify a change in the zone of the device, and generates a message for an expander in the topology based on the change in the zone. The management device then transmits the message to the expander to restore the zone of the device to the initial zone.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
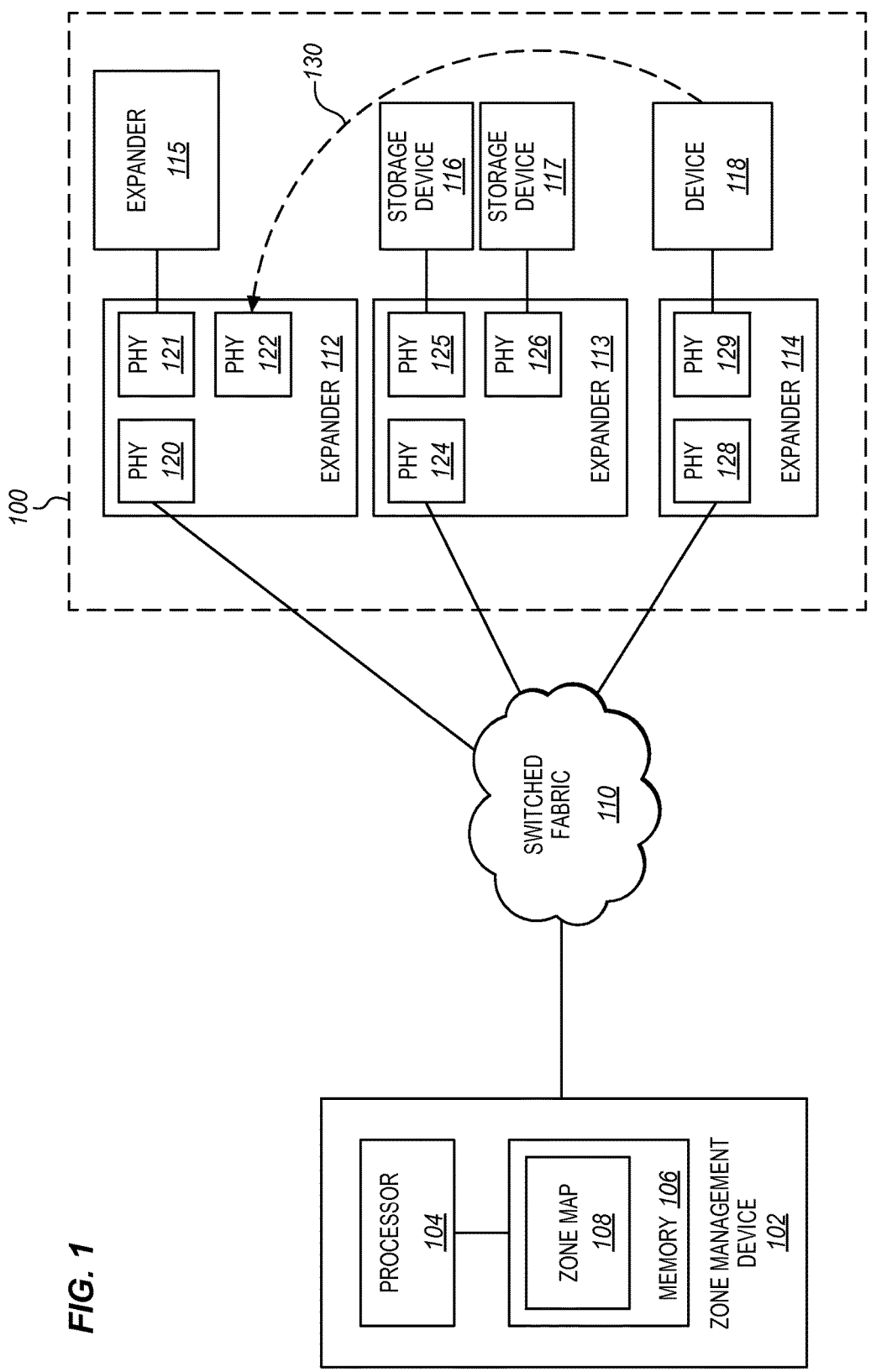
FIG. 1 is a block diagram of a zone management device and a storage topology in an exemplary embodiment.

FIG. 1 is a block diagram of a zone management device 102 and a storage topology 100 in an exemplary embodiment. In this embodiment, zone management device 102 is any suitable apparatus that is able to manage zoning for devices in a Serial Attached Small Computer System Interfaces (SAS) storage network. Zone management device 102 performs zone management for devices on a per-device basis rather than on a per-PHY basis. Zone management device 102 may be implemented in an expander, may be implemented within a storage controller of a host, or may be implemented as a stand-alone device.

SAS includes zoning features that are implemented in zoning-capable expanders. Zoning is used in SAS to restrict the communications between devices. Typically the devices are restricted to communicating with other devices based on explicit permissions are set by an administrator, with some exceptions. Up to 256 zones are supported in the T10/1760-D Revision 16 SAS-2 working draft, with zones 8-255 being user-defined. Zones 4-7 are reserved, and zones 0-3 are special. Devices in zone 0 have access to devices in zone 1, and do not have access to devices in other zones. Devices in zone 1 have access to devices in all zone groups. Devices in zone 2 and 3 have access to devices as per the zone permission table, which is configured at expanders. Also, certain SMP related functions are restricted in zone 2 and 3. For the user-defined zones 8-255, communication permissions are controlled by the zone permission table(s). This allows, for example, devices in zones 8 and 14 to communicate with each other, while devices in zones 8 and 10 are not allowed to communicate with each other.

As per T10/1760-D Revision 16, zoning is performed at PHYs of expanders that support zoning. Each PHY on an expander can be configured to belong to a different zone, if desired. PHYs on a suitable expander are configured by assembling a CONFIGURE ZONE PHY INFORMATION request message for the expander, which includes the group ID information (i.e., zone information) for a particular PHY within a ZONE PHY configuration descriptor.

Once a zone is configured for a PHY, devices plugged into the PHY belong to the zone assigned to that PHY. The device may be a storage device (e.g., a SAS or Serial Attached Advance Technology Attachment (SATA) device), or the device may be another expander. If the device is an expander, then the expander and any devices coupled to the expander belongs to the same zone if the expander is outside of the Zoned Portion of the Service Delivery Subsystem (ZPSDS). An expander will be outside of the ZPDS if zoning is not supported on the expander, if zoning is disabled on the expander, or if the "inside ZPDS" bit is not set on the expander.

In this embodiment, a processor 104 of zone management device 102 utilizes a zone map 108 stored in a memory 106 to track zone information for one or more devices in topology 100. In general, zone map 108 stores information that uniquely identifies devices in topology 100 and correlates the devices with their zone information. For instance, zone map 108 may correlate a SAS World Wide Name (WWN) for an expander and/or a storage device in topology 100 with zone information for the device. This allows zone management device 102 to perform zone management functions on a per-device basis rather than a per-PHY basis by tracking how devices move within topology 100, and to automatically re-zone devices after the change. This will be discussed in more detail with regard to FIG. 2.

Referring again to FIG. 1, topology 100 in this embodiment includes expanders 112-115, storage devices 116-117, and device 118. Expander 112 includes PHYs 120-122, with PHY 120 coupling expander 112 to a switched fabric 110 (e.g., a SAS fabric). Expander 113 includes PHYs 124-126, with PHY 124 coupling expander 113 to switched fabric 110. And, expander 114 includes PHYs 128-129, with PHY 128 coupling expander 114 to switched fabric 110. Further, expander 115 is coupled to expander 112 via PHY 121, storage device 116 is coupled to expander 113 via PHY 125, and storage device 117 is coupled to expander 113 via PHY 126. Device 118, which may be a storage device or an expander, is coupled to expander 114 via PHY 129.

Although a particular configuration for topology 100 is shown in FIG. 1, one skilled in the art will recognize that topology 100 may be implemented in a number of ways as a matter of design choice. Thus, the particular configuration illustrated in FIG. 1 for topology is merely presented for purposes of discussion.

Consider that zone management device 102 is coupled with topology 100 via switched fabric 110, and that an administrator has configured zoning for device 118. To do so, the administrator may utilize management tools to configure PHY 129 to a particular user-defined zone. Device 118 would therefore belong to an initial zone or zone group within topology 100.

Figure 2:
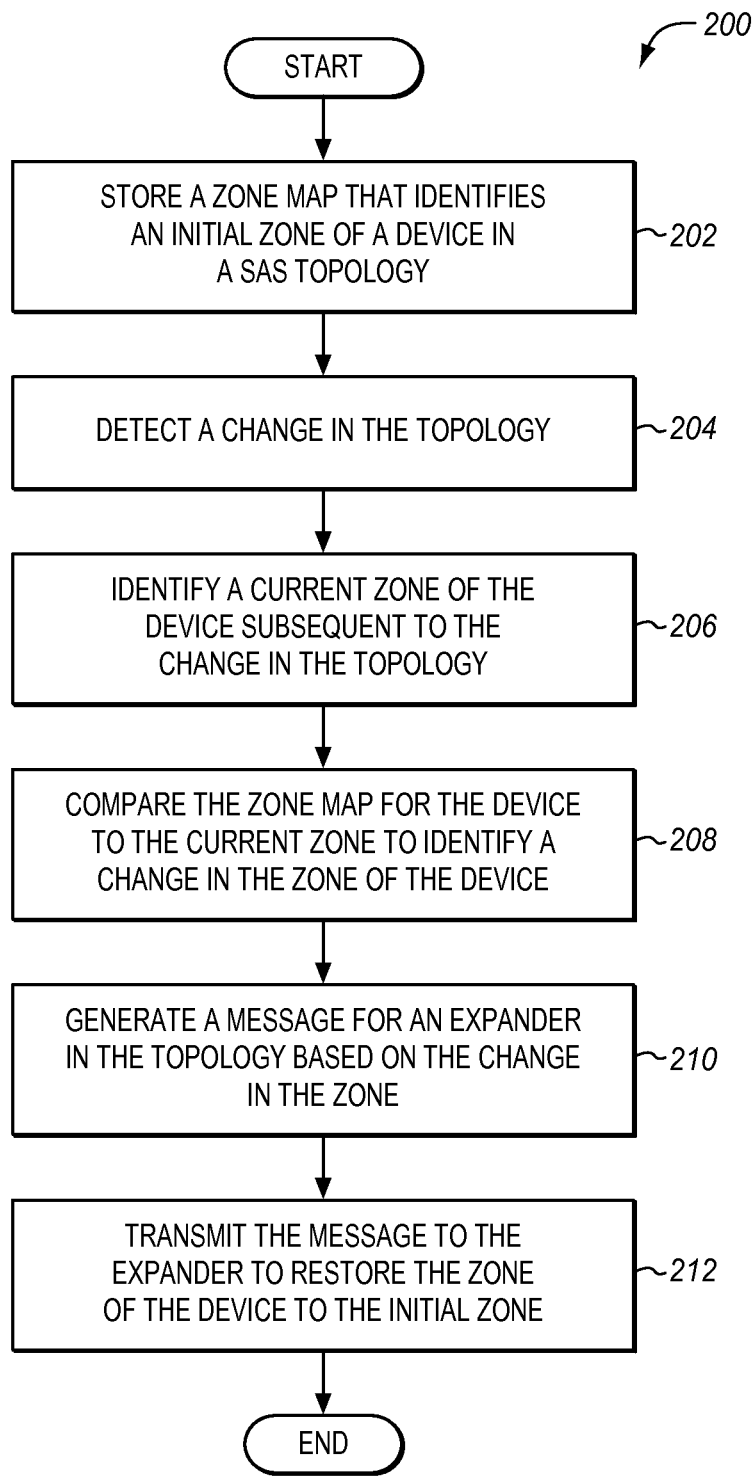
FIG. 2 is a flowchart illustrating a method of providing zone management for devices in a SAS topology in an exemplary embodiment.

FIG. 2 is a flowchart illustrating a method 200 of providing zone management for devices in a SAS topology in an exemplary embodiment. The steps of method 200 are described with reference to zone management device 102 of FIG. 1, but those skilled in the art will appreciate that method 200 may be performed by other systems that are not shown. The steps of method 200 are not all inclusive and may include other steps not shown. The steps may also be performed in an alternative order.

During operation, zone management device 102 assembles information about the devices in topology 100 and which, if any, zone(s) the devices belong to. To do so, zone management device 102 may perform a discovery process within topology 100, may query expanders 112-115 for information regarding their connected devices, if any, and zone information for any associated PHYs, etc. For instance, zone management device 102 may query expander 114 via a SAS DISCOVER request, and receive a SAS DISCOVER response from expander 114 that includes zone information for PHY 129, which couples device 118 to expander 114. Regardless of the particular mechanism for identifying an initial zone that device 118 belongs to, zone management device 102 stores the initial zone information for device 118 in zone map 108 (see step 202).

At some point topology 100 changes, and processor 104 of zone management device 102 detects the change (see step 204). Detecting the change in topology 100 may entail processor 104 querying expanders 112-115 to identify their attached devices, and detecting differences in the devices attached to a particular expander from one query to another query. Alternatively or additionally, detecting the change may entail receiving a Broadcast Change Notification (BCN) from one or more expanders 112-115 that indicate PHY connection changes on the expander(s). Generally, the changes to topology 100 entail a device (e.g., device 118) being moved from one PHY to another PHY within topology 100. This may occur due to load balancing concerns, due to planned or unplanned maintenance, etc. For purposes of discussion, FIG. 1 illustrates that device 118 is moved from PHY 129 of expander 114 to PHY 122 of expander 112, as shown by dashed arrow 130. Because device 118 is now coupled to a different PHY, device 118 would belong to a different zone than previously under per-PHY zoning. Device 118 may now belong to the default zone zero, or to some user-defined zone that was previously assigned to PHY 122.

In response to detecting the change in topology 100, processor 104 identifies a current zone of device 118 (see step 206). Identifying the current zone may entail performing a new discovery process for topology 100, querying various expanders for their connected devices and zone information (via DISCOVER request/response pair, etc.). Identifying the current zone may also include querying device 118 for WWN information about device 118 (i.e., if device 118 is a SAS device), reading Vital Product Data (VPD) page(s) on device 118 (i.e., if device 118 is a SATA device) for serial numbers assigned to device 118, etc. The WWN information and/or the VPD information may then be used to identify device 118 in zone map 108, and allow processor 104 to compare the initial zone for device 118 with the current zone to identify changes in the zone for device 118 (see step 208).

In this embodiment, device 118 moved from PHY 129 on expander 114 to PHY 122 on expander 112, which results in device 118 belonging to a zone that is different than the initial zone that device 118 belonged to. Processor 104 then generates a message for expander 112 based on the change in the zone for device 118 (see step 210). For instance, if device 118 initially belonged to zone 12, then processor 104 will generate a message for expander 112 that assigns PHY 122 to zone 12. As discussed previously, the message may be a ZONE PHY configuration descriptor formulated within a CONFIGURE ZONE PHY INFORMATION request message for expander 112.

In response to generating the message, processor 104 transmits the message to expander 112 to restore the zone of device 118 to the initial zone device 118 belonged to. This allows device 118 to automatically return to the initial zone for device 118 even though changes to topology 100 may have moved device 118 to a completely different PHY, which improves the performance of topology 100.

Figure 3:
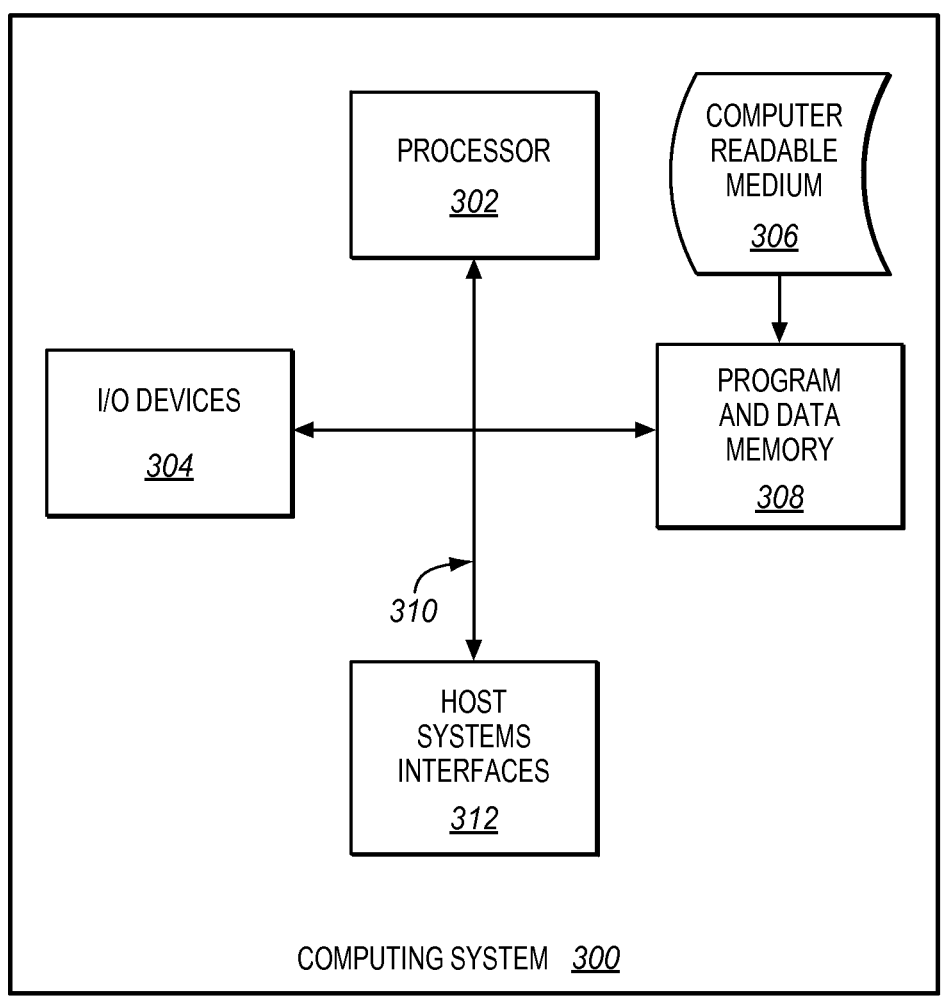
FIG. 3 illustrates a computing system in which a computer readable medium provides instructions for performing methods herein.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 3 illustrates a computing system 300 in which a computer readable medium 306 provides instructions for performing any of the methods disclosed herein.

Furthermore, embodiments of the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computing system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 608 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 312, or remote printers or storage devices through intervening private or public networks. Modems, cable modem and Ethernet cards are just a few of the currently available types of network adapters.

What is claimed is:

1. An apparatus, comprising:
a memory operable to store a zone map that identifies an initial zone of a device in a Serial Attached Small Computer Serial Interface (SAS) topology, wherein the topology includes a plurality of expanders, each expander having one or more PHYs that are assigned to respective zones; and
a processor operable to detect a change in the topology that moves the device from a first PHY of the plurality of PHYs that is assigned to the initial zone to a second PHY of the plurality of PHYs that is assigned to a second zone, to compare, using the zone map, the initial zone of the device to the second zone thereby identifying a change in the zone of the device occurring as a result of moving the device from the first PHY to the second PHY, to generate a message for an expander in the topology having the second PHY based on the change in the zone, and to transmit the message to the expander to change the zone of the device from the second zone to the initial zone while maintaining the change in the topology that moved the device from the first PHY to the second PHY and while maintaining initial zones of other devices connected to other PHYs of the expander.

2. The apparatus of claim 1, wherein:
the first PHY belongs to a first expander and the second PHY belongs to a second expander;
the processor detects the change in the topology by receiving a Broadcast Change Notification from the expander;
the zone map includes a unique identifier for the device;
the processor is further operable to identify a movement of the device in the topology based on the unique identifier; and
the unique identifier includes an SAS World Wide Name (WWM).

3. The apparatus of claim 2, wherein:
the processor is further operable to identify the expander in the topology that the device is coupled to based on the unique identifier for the device.

4. The apparatus of claim 2, wherein:
the zone map correlates a Vital Product Data page stored on the device with the initial zone of the device.

5. The apparatus of claim 2, wherein:
the zone map correlates a Serial Attached Small Computer Serial Interface World Wide Name of the device with the initial zone of the device.

6. The apparatus of claim 1, wherein:
the processor and the memory are connected to the plurality of expanders in the topology through a switched fabric such that the processor controls all zone management functions for the plurality of expanders;
the processor is further operable to query the expander to identify the second zone of the device.

7. The apparatus of claim 1, wherein:
the message for the expander is a ZONE PHY configuration descriptor within a CONFIGURE ZONE PHY INFORMATION request message; and
the device is a single expander.

8. A method, comprising:
storing a zone map that identifies an initial zone of a device in a Serial Attached Small Computer Serial Interface (SAS) topology, wherein the topology includes a plurality of expanders, each expander having one or more PHYs that are assigned to respective zones;
detecting a change in the topology that moves the device from a first PHY of the plurality of PHYs that is assigned to the initial zone to a second PHY of the plurality of PHYs that is assigned to a second zone;
comparing, using the zone map, the initial zone of the device to the second zone thereby identifying a change in the zone of the device occurring as a result of moving the device from the first PHY to the second PHY;
generating a message for an expander in the topology having the second PHY based on the change in the zone; and
transmitting the message to the expander to change the zone of the device from the second zone to the initial zone while maintaining the change in the topology that moved the device from the first PHY to the second PHY and while maintaining initial zones of any other devices connected to other PHYs of the expander.

9. The method of claim 8, wherein:
the first PHY and the second PHY belong to a same expander;
the detecting detects the change in the topology by receiving a Broadcast Change Notification from the expander;
the device is a single expander;
the zone map includes a unique identifier for the device;
the method further comprises identifying a movement of the device in the topology based on the unique identifier; and
the unique identifier includes an SAS World Wide Name (WWM).

10. The method of claim 9, wherein:
the method further comprises identifying the expander in the topology that the device is coupled to based on the unique identifier for the device.

11. The method of claim 9, wherein:
the zone map correlates a Vital Product Data page stored on the device with the initial zone of the device.

12. The method of claim 9, wherein:
the zone map correlates a Serial Attached Small Computer Serial Interface World Wide Name of the device with the initial zone of the device.

13. The method of claim 8, wherein: the method further comprises:
  querying the expander to identify the second zone of the device by issuing a DISCOVER request to the expander.

14. The method of claim 8, wherein:
  the message for the expander is a ZONE PHY configuration descriptor within a CONFIGURE ZONE PHY INFORMATION request message.

15. A non-transitory computer readable medium embodying programmed instructions which, when executed by one or more processors, direct the one or more processors to:
  store a zone map that identifies an initial zone of a device in a Serial Attached Small Computer Serial Interface (SAS) topology, wherein the topology includes a plurality of expanders, each expander having one or more PHYs that are assigned to respective zones;
  detect a change in the topology that moves the device from a first PHY of the plurality of PHYs that is assigned to the initial zone to a second PHY of the plurality of PHYs that is assigned to a second zone;
  compare, using the zone map, the initial zone of the device to the second zone thereby identifying a change in the zone of the device occurring as a result of moving the device from the first PHY to the second PHY;
  generate a message for an expander in the topology having the second PHY based on the change in the zone; and
  transmit the message to the expander to change the zone of the device from the second zone to the initial zone while maintaining the change in topology that moved the device from the first PHY to the second PHY and while maintaining initial zones of all other devices connected to other PHYs of the expander, wherein the device is a single expander or a single storage device.

16. The non-transitory medium of claim 15, wherein:
  the first PHY belongs to a first expander and the second PHY belongs to a second expander;
  the instructions further direct the one or more processors to detect the change in the topology by receiving a Broadcast Change Notification from the expander;
  the zone map includes a unique identifier for the device;
  the instructions further direct the one or more processors to identify a movement of the device in the topology based on the unique identifier; and
  the unique identifier includes an SAS World Wide Name (WWM).

17. The non-transitory medium of claim 16, wherein:
  the instructions further direct the one or more processors to identify the expander in the topology that the device is coupled to based on the unique identifier for the device.

18. The non-transitory medium of claim 16, wherein:
  the zone map correlates a Vital Product Data page stored on the device with the initial zone of the device.

19. The non-transitory medium of claim 16, wherein:
  the zone map correlates a Serial Attached Small Computer Serial Interface World Wide Name of the device with the initial zone of the device.

20. The non-transitory medium of claim 15, wherein:
  the instructions further direct the one or more processors to:
  identify an expander in the topology that the device is coupled to subsequent to the change in the topology; and
  query the expander to identify the second zone of the device.

* * * * *